Jan. 18, 1966    G. BRUCK ETAL    3,230,302
TELEVISION PROGRAM DISTRIBUTION AND METERING SYSTEM
Filed Feb. 13, 1959    6 Sheets-Sheet 3

INVENTORS.
GEORGE BRUCK.
PAUL F. G. HOLST.
BY
ATTORNEYS.

INVENTORS.
GEORGE BRUCK.
PAUL F. G. HOLST.
BY Alden D. Redfield
Charles M. Hogan
ATTORNEYS.

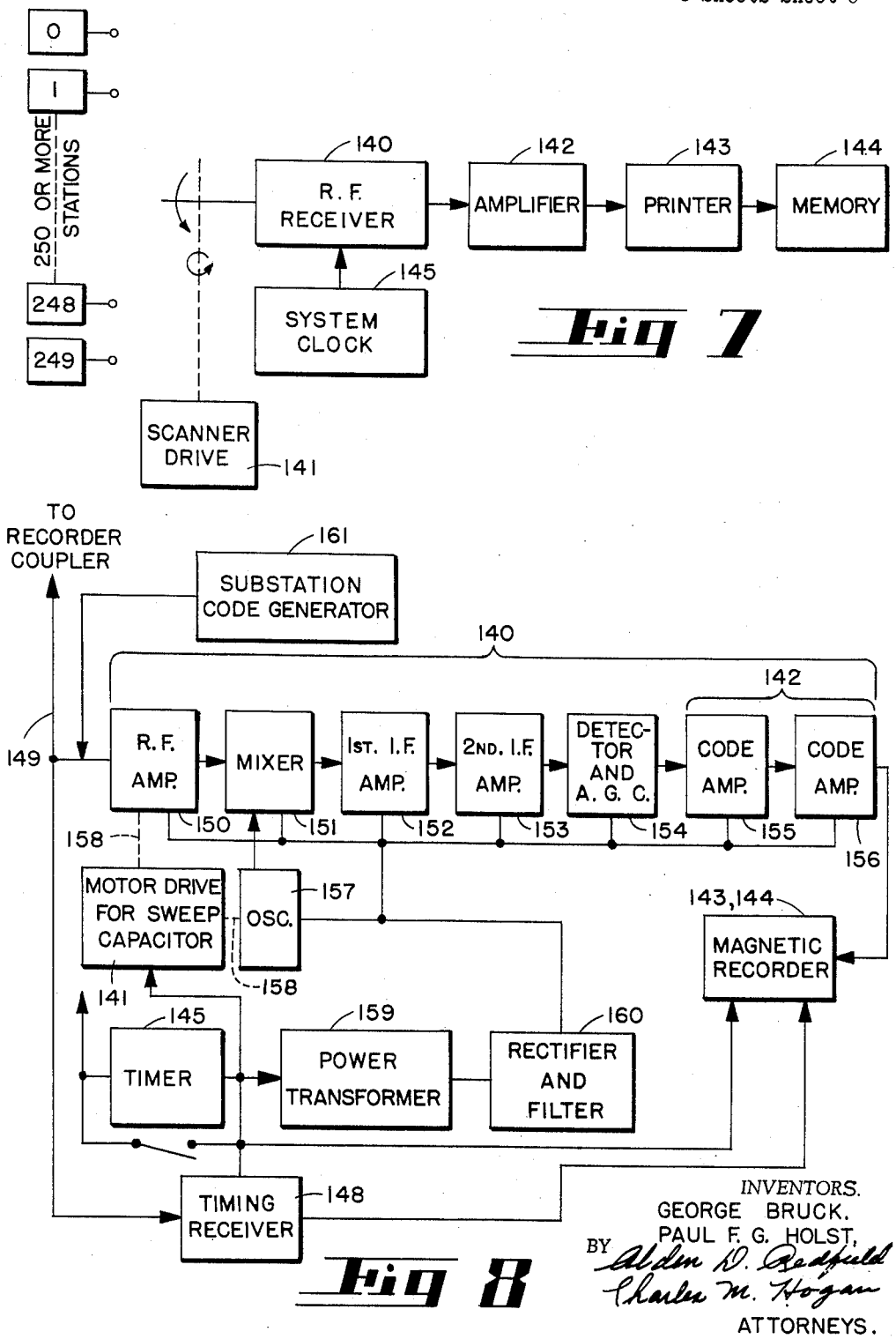

United States Patent Office
3,230,302
Patented Jan. 18, 1966

3,230,302
TELEVISION PROGRAM DISTRIBUTION AND
METERING SYSTEM
George Bruck, Cincinnati, Ohio, and Paul F. G. Holst, Syosset, N.Y., assignors to Avco Manufacturing Corporation, Cincinnati, Ohio, a corporation of Delaware
Filed Feb. 13, 1959, Ser. No. 793,208
7 Claims. (Cl. 178—5.1)

The present invention relates to wire distribution systems for subscription television, commonly known as "pay TV."

A primary object of the invention is to provide a wired pay TV system characterized by maximum security (i.e., protection against unauthorized non-revenue-paying usage).

Another principal object of the invention is to provide a simple and effective means for measuring, recording, and facilitating the billing for the type and quantity of service used by the subscribers.

A further object of the invention is to provide a pay TV metering system which involves no coin collections, handling of punch cards, or voluntary conscious acts on the part of the subscribers.

It is also an object of the invention to provide a system which is free of the disadvantages and limitations of complex picture scrambling and unscrambling techniques and can utilize for visual and aural reproduction existing television receivers without any internal modification.

Yet another object of the invention is to provide a distribution system having subscriber lines so arranged that each subscriber's station sends service-usage signal information back through a coupler to recording equipment simultaneously with pay TV reception at that station.

An object of the invention is to provide a system in which the subscriber may, at his election, enjoy one of a plurality of paid programs, or a free wired program, or any of the commercially broadcast programs available in his locality.

Various additional objects of the invention are to provide:

(1) A simple, easily installed converter unit, which is placed in the subscriber's location and conveniently manually operated consciously to select the desired program and to attune the subscriber's receiving equipment to such program.

(2) A converter having switching operable to facilitate the subscriber's ready selection of pay programs, a free wired program, or any of the commercially broadcast television programs available in any given location.

(3) A security unit which is located outside the subscriber's house in a place not readily accessible to the subscriber, and which renders release of the program and metering of service mutually dependent conditions, so that service cannot be obtained without metering and so that the usage of service insures metering. The expression "metering" is herein used to mean the furnishing of signal indications as to whether the subscriber is using service, what service he is using, what service periods are involved, and the identity of the subscriber.

(4) A security unit which is supplied with power only when the converter is receiving signals on a wired channel and which functions to couple the desired channel to the converter only when metering is being performed.

(5) A security unit which couples or uncouples the distribution system to or from the subscriber's equipment at a location substantially inaccessible to the subscriber, so that he cannot establish the service-delivery connection in an unauthorized manner.

(6) A security unit which confines the subscriber to the particular pay TV channel or program being metered.

(7) A security unit which provides metering signals for any one of several available pay TV programs, each characterized by a different billing rate and distributed on a different frequency channel in the same distribution system.

(8) A security unit which, while insuring against unauthorized usage, facilitates authorized delivery of service and reduces the customer's order for service to a simple switching operation.

(9) A security unit which, while responding to power furnished from the subscriber's converter unit to deliver the desired program to the converter, simultaneously initiates the operation of code-generating and transmitting equipment which identifies the subscriber and the channel and also furnishes duration-of-use information to recording equipment. The code generator and transmitter are energized by the same power lines.

(10) A scanning or sweep receiver system for determining the usages (i.e., electronically reading the metering signals) at each of the subscribers' stations in a substation group. This function is performed on a basis completely independent and beyond the control of, and not subject to interference from, the subscribers. That is to say, substation scanning and recording equipment continuously obtains and stores these data: the identification of each subscriber, the program service he is using, and the duration of such usage.

(11) A "digital speaking" transmitter, which in interlocked fashion transmits remotely-read metering signals through a subscriber coupler in one direction toward a central station or substation while the service is being delivered through said coupler in the other direction. This device is of general utility in service distribution systems. The device eliminates manual meter reading and processing, simplifies subscriber installations, and indicates the type of service and its duration as it is being delivered to the individual subscriber.

(12) A closed-circuit distribution system comprising: a central station which originates program transmissions and may also be arranged to process data for invoices, a coaxial network composed of trunk and branch lines, branch line or subscriber couplers for distributing the program to a plurality of subscriber installations, branch-line scanner recorders, security and metering-signal devices near each of the subscribers' locations, and selector-converter devices at each of said locations.

(13) Means for identifying each subscriber by both a digital code and a channel frequency assignment, the code being modulated onto a high-frequency carrier. Each subscriber is provided with a plurality of codes, one for each service available.

(14) A frequency sweeping receiver and recording system, located at a substation, for automatically interrogating the metering-signal devices of a group of subscribers and storing the service-usage and identifying data received from them. This system includes scanner-recorder means for recording the metering information, which information identifies each subscriber by digital code and frequency. This means is of general utility. The digital-coded metering information also identifies the service or program being used. The central transmitting station, preceding the start of each transmission, transmits to the recorders signals indicative of program, starting time and duration. The subscriber selects the program desired by tuning his converter, which in turn supplies power to the subscriber security unit of the proper order to instruct voltage-sensitive relays in the desired selection of program material. The metering-signal device (i.e., code generator and transmitter) in the security unit is simultaneously instructed that a particular service is being used, and the correct code is established. The scanner device at a substation periodically "looks at" each security unit transmitter and "reads its metering signals." The information received by the scanning device is recorded at the substation. The data stored in the recorder are reduced to time and rate and invoiced to the subscribers.

For a better understanding of the invention, together with other and further objects, advantages, and capabilities thereof, reference is made to the following description of the accompanying drawings.

In the drawings:

FIGS. 1, 2, 3, 4, 7, and 8 are block diagrams, all in accordance with the invention, respectively showing the following:

FIG. 1—A preferred embodiment of a complete pay television distribution system;

FIG. 2—Another embodiment of a pay television distribution system, basically included in the present invention, but including also improved features claimed in the copending patent application of George Bruck, Serial No. 793,209, now Patent No. 3,050,712, filed contemporaneously herewith, entitled "Wired Program Distribution System" and assigned to the same assignee as the present application and invention;

FIG. 3—The subscriber equipment inclusive of the selector-converter unit at the subscriber's station and the security unit at a substantially inaccessible place near the subscriber's location, these units being shown in their general relationship to the central station and a substation;

FIG. 4—The selector-converter at the subscriber's station and the elements of the security unit, inclusive of the coding and switching and filtering arrangements;

FIG. 7—The scanner receiver-recorder as provided at each substation;

FIG. 8—Further details of the scanner receiver-recorder system of FIG. 7 including the various stages and principal system units.

FIG. 9 is a showing of the wave forms of a representative digital code, transmitted from the security unit for metering purposes.

The system

Figure 1:
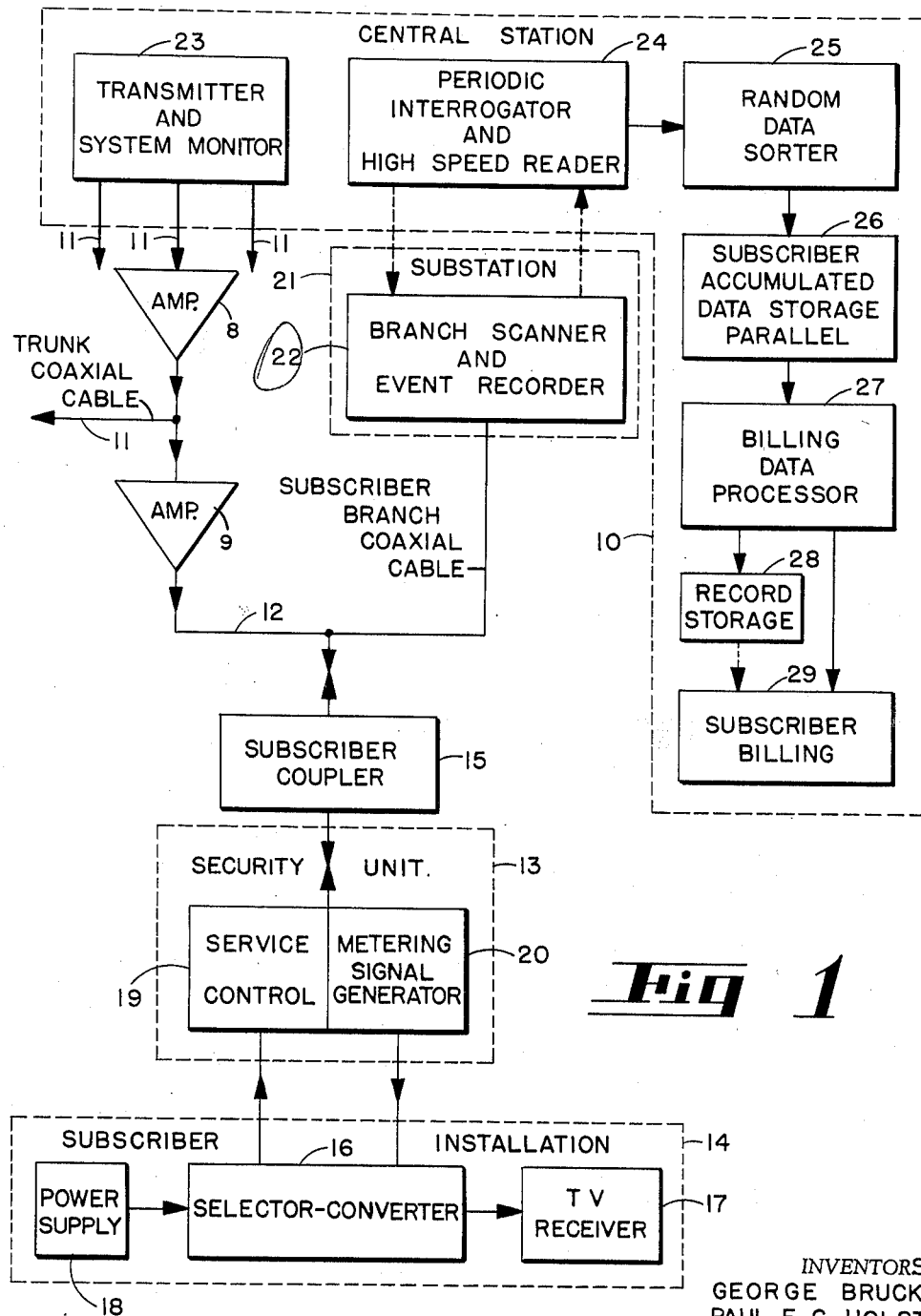

A perferred embodiment of service distribution system is illustrated in FIG. 1, which shows a complete closed circuit transmission system for programmed pay television service. That system comprises:

A central station 10, which originates program transmissions and may process billing information;

A primary program or service distribution network comprising a plurality of coaxial trunk cables 11, coupled to the central station transmitter;

A plurality of coaxial branch cables (a representative one of which is illustrated at 12), these branch cables constituting the secondary program distribution system;

And a plurality of subscriber station equipments, a representative one of which is illustrated by a security unit 13 and a subscriber home installation 14. Many subscriber equipments are coupled to each branch coaxial cable as by a coupler 15.

Each home installation comprises a selector-converter 16, which consists of a selector operable by the subscriber to select the desired program and a converter for converting the modulated carrier signals in the channel pertinent to such program into signals suitable for application to the input of a home television receiver 17. Each home installation further includes a power supply 18 which is exploited in a novel manner for security purposes, as will be made apparent later in the description. Each security unit comprises service control means 19, controlled by the associated selector for switching the desired program to the associated subscriber home installation 14, together with metering signal generating means 20 interlocked with the selector for generating metering signals which identify the subscriber and the program being received. These metering signals are transmitted from meter 20 via the subscriber coupler 15 to the coaxial branch cable 12 and then to a substation 21. The substation includes suitable scanning and recording equipment 22 for reading and recording the metering signals from a plurality of subscriber equipments—that is to say, from all of the subscriber equipments coupled to a given subscriber branch coaxial cable.

Parenthetically, the subscriber coupler 15 is preferably in the advanced form shown in the copending United States patent application of Emmery J. H. Bussard, entitled "Coupler for Transmission Line," Serial No. 771,542, filed in the United States Patent Office on November 3, 1958, and assigned to the same assignee as the present application and invention, now U.S. Patent 2,963,665, issued December 6, 1960. Reference is made to such patent for a detailed description of a suitable subscriber coupler.

The central station equipment may comprise the following principal units:

A transmitter and system monitor 23;

A periodic interrogator and high-speed reader 24 for serially reading and recording all substation metering data;

A random data sorter 25;

A parallel data storage accumulator 26;

A billing data processor 27;

And suitable record storage and subscriber billing equipments 28 and 29.

The invention contemplates that a metropolitan area will be networked by a grid of coaxial transmission lines carrying a plurality (for example, three) of radio frequency channels with standard monochrome or color television signal modulations, such channels being hereinafter referred to as channels A, B, and C. Suitable illustrative frequencies are:

| Channel | Band, mc. | Sound, mc. | Picture, mc. |
|---|---|---|---|
| C | 16–22 | 16.25 | 20.75 |
| A | 26–32 | 26.25 | 30.75 |
| B | 34–40 | 34.25 | 38.75 |

These channels are therefore preferably located, carrier frequency-wise, in a region of the spectrum below the standard television broadcast bands, and the signal transmission will originate in unit 23. The grid of transmission lines comprises the primary system of cables 11, the secondary system of cables 12, and the tertiary or service system constituted by the couplings to the subscriber equipments. Suitable amplifiers 8 and 9 are inserted in the distribution system as required. In one exemplary system, channels A and B constitute pay service, while channel C furnishes program previews, announcements of interest to the subscriber, and sustaining programs such as high-fidelity music, all at no cost to the subscriber.

The primary trunk grid network terminates in the branch lines (such as 12), which through couplers (such as 15) provide service to hundreds of subscribers per branch line. Service may be supplied to from one to eight customers through each coupler 15, and a large plurality of couplers will therefore be inserted in each branch cable 12. All subscribers coupled to a given branch cable constitute a group. The metering signal generator of each individual subscriber in a group generates carrier signals for metering purposes in the radio frequency spectrum—from 3 to 5 megacycles, for example—and the signal output of the metering signal generator is, as described hereinbelow, modulated in terms of binary codes which identify the subscriber, the channel to which he is tuned, and the duration of his usage. This frequency range of 3 to 5 megacycles is hereinafter referred to as the subscriber code transmission band.

Programs in all of the three channels are simultaneously available in the primary and secondary distribution systems. The programs on channels A and B may be graded to carry different billing rates. All channels are metered in accordance with time usage and the grade of the program delivered.

In practice, the subscriber manipulates a tuning dial in the selector-converter unit 16 to select the desired channel A, B, or C. Interlocked with the selector are the two principal functional arrangements in the security unit. One of these, 20, furnishes metering signals indicative of the subscriber's choice of program and identity. The other arrangement, 19, releases the program to the subscriber home installation 14. Therefore it will be seen that this service distribution system provides a method of metering which comprises the steps of delivering service to the subscriber home installation and simultaneously returning from the subscriber location to the distribution system signals identifying the subscriber by carrier frequency and coded modulation.

The metering information is transmitted via the branch cable 12 to the substation 21, at which it may be recorded on tape, for example. There are also recorded on such tape the substation "call letters" and information transmitted to substation 21 by transmitter 23 to indicate the program numbers and grades and time of transmission. Metering signals from the subscribers' equipment are random-recorded by means of a frequency scanning device 22 operating in a frequency range inclusive of the discrete frequencies of the subscribers' meters, but outside of the frequency range of the program channels. The permanent tape record of usage information is made up at each substation over a prescribed period—for example, two weeks—and then either manually delivered to the central processing station or transmitted thereto in serial form. At the central station the random data are sorted and reduced to parallel or ledger information for billing purposes.

In addition to the program transmitter, the central station also includes transmitting equipment for announcing programs. Prior to the start of each transmission, this equipment transmits and distributes on channel C announcements of program number and grade and time and duration of the program. This information is recorded at each substation 21. In the program start and signal-generating means at the transmitter, the code signal is modulated onto the output of an oscillator, having a frequency of 25 kilocycles, for example, and the sound carrier of channel C is frequency modulated with the oscillator output. As stated above, the subscriber selects the desired program by manipulation of the dial or knob in unit 16. The selection of a paid program couples the power supply 18 to the security unit to energize the latter. This is an additional security measure, in that unauthorized operation of the security unit is thereby prevented. The manipulation of the tuning dial to demand paid program service renders the security unit operative to deliver the service and simultaneously to generate the metering signals. The service control unit 19 and the metering signal generator 20 so operate that when the particular channel is selected and the program in it delivered, metering signals identifying that channel and the subscriber are transmitted. The scanner device 22 at the substation periodically "looks at" each security unit transmitter and "notes" the usage or lack of usage there indicated. Information received by the branch scanner 22 is there recorded on drum, grid, or tape. Data extracted from such recorder are reduced to time and rate and transferred to billing cards by well-known data processing methods, such as are employed by public utilities.

The security provisions

The distribution of closed circuit utility or entertainment service is susceptible to unauthorized appropriation of service and tampering. In accordance with a principal feature of the invention, there are provided security methods and equipment which render service usage and metering mutually dependent or interlocked conditions, thus preventing unauthorized appropriation of the service. Security is accomplished by rendering the security unit substantially inaccessible to the subscriber, by the interlock of delivery and metering of the program, and by rendering the operation of the security unit dependent on the furnishing of energy controlled by the selector. Such control inherently accompanies the subscriber's demand for service and all usage of such service, and is automatically achieved without any conscious act on the part of the subscriber. Without any placement of cards or deposit of coins or oral request for service, the subscriber simply manipulates the selector and the usage is metered.

Information flow to the subscriber is limited to one channel at a time. The service control means 19 in the security unit 13 prevents the release of any service to the subscriber except when the metering signal generator unit 20 is operating. Further, metering is premised on the duration and rate of service. The combination of these devices, all cooperatively exploited, assures foolproof metering.

Figure 3:
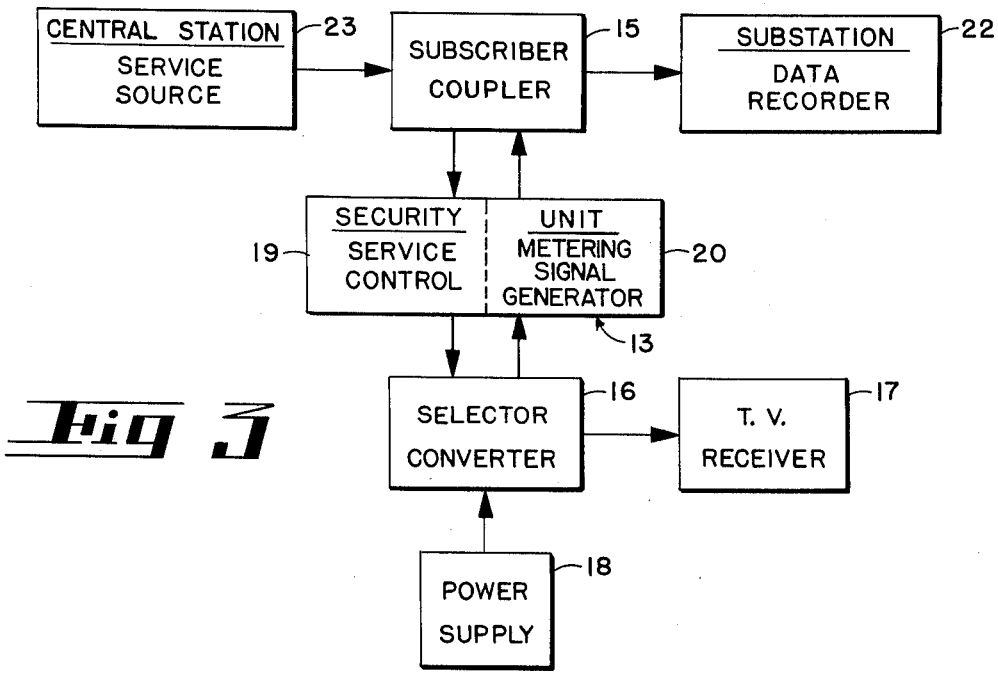
Figure 4:
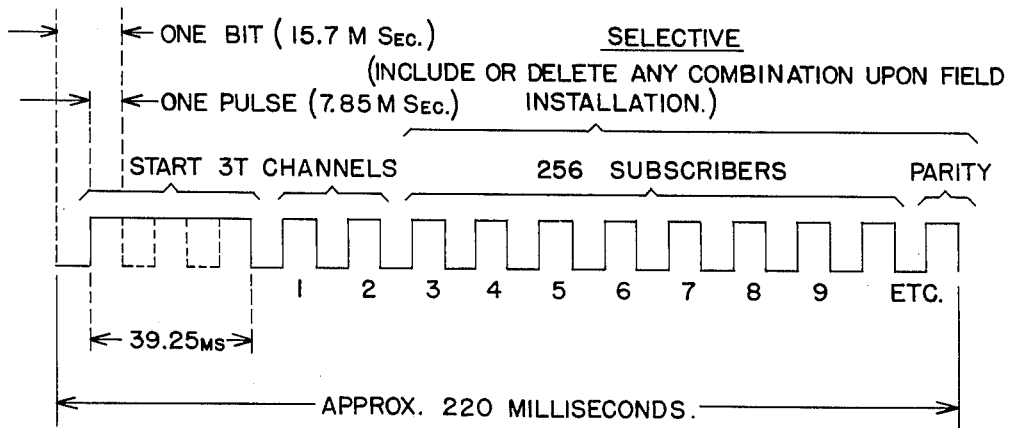
Figure 4:
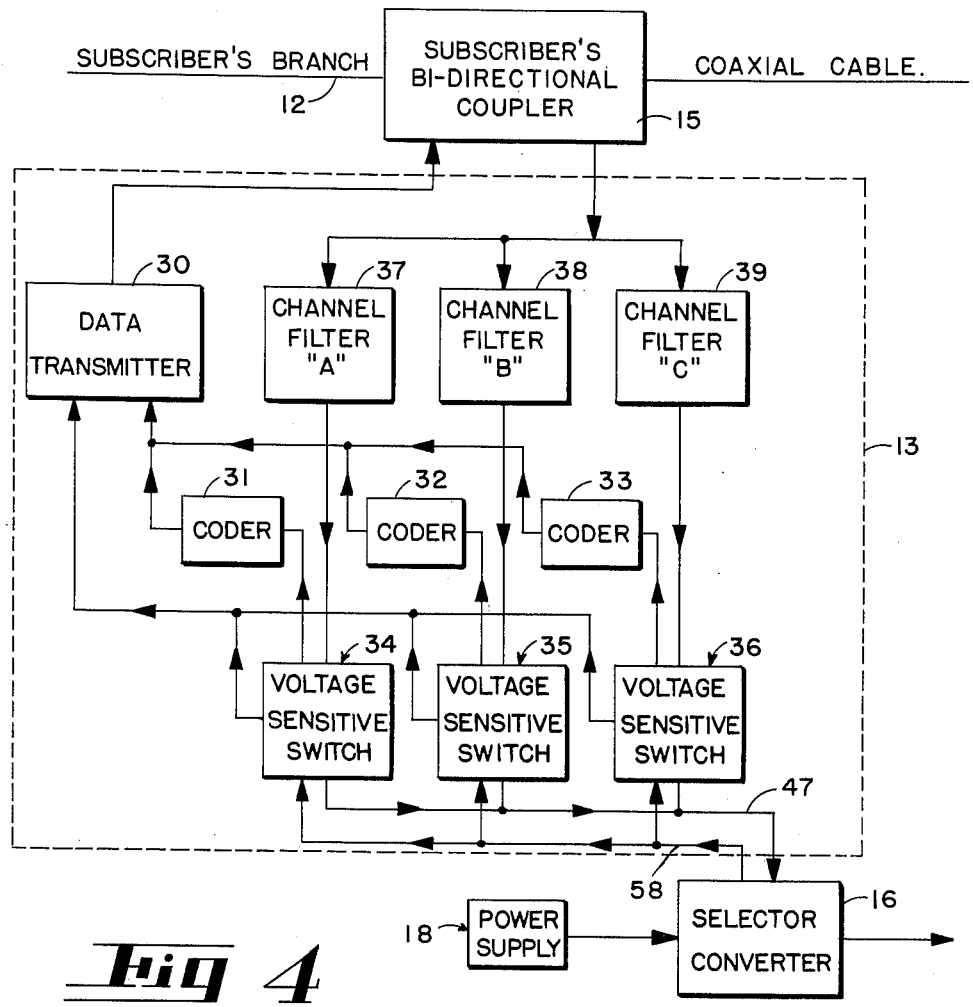

Making reference to FIG. 3, the security unit 13 is located at a place substantially inaccessible to the subscriber, and it interlocks the furnishing of the program and the metering of usage. Unit 13 is located in a place near the home installation, such as on a telephone pole. Unit 13 is shown in FIG. 4 in highly simplified form. It comprises a transmitter 30 (FIG. 4) for generating metering signals, code-generating means 31, 32, and 33 for each channel, each of these code-generating means being coupled to the transmitter 30 to modulate channel-indicating and subscriber-identifying digital code signals on the input of such transmitter. The security unit further comprises voltage-sensitive switch means 34, 35, and 36 energized from power supply 18, by reason of the operation of the selector-converter 16, to render operative the transmitter 30 and the appropriate one of the code-generating means 31, 32, and 33. The security unit further includes filter means 37, 38, and 39 directly actuated by the voltage-sensitive switches but indirectly controlled by the selector-converter 16 for releasing signals on the desired channel A, B, or C into the selector-converter means 16.

Parenthetically referring to FIG. 3 for the moment, positioning the tuning dial in unit 16 for channel A, B, or C causes power to be released from unit 18 to the security unit 13. The security unit permits the desired program to pass from the coupler 15 to the selector-converter 16 and also sends metering signals back through the coupler to the substation 21. Assume a service involving three channels A, B, and C originating at the service source 23 and having different charge rates. Transmissions in all three channels are impressed on the service coupler 15 and made available at the security unit 13, where they are terminated and isolated from the selector-converter 16 except when service is demanded. That is to say, all service is shorted out except when service is demanded.

Figure 6:
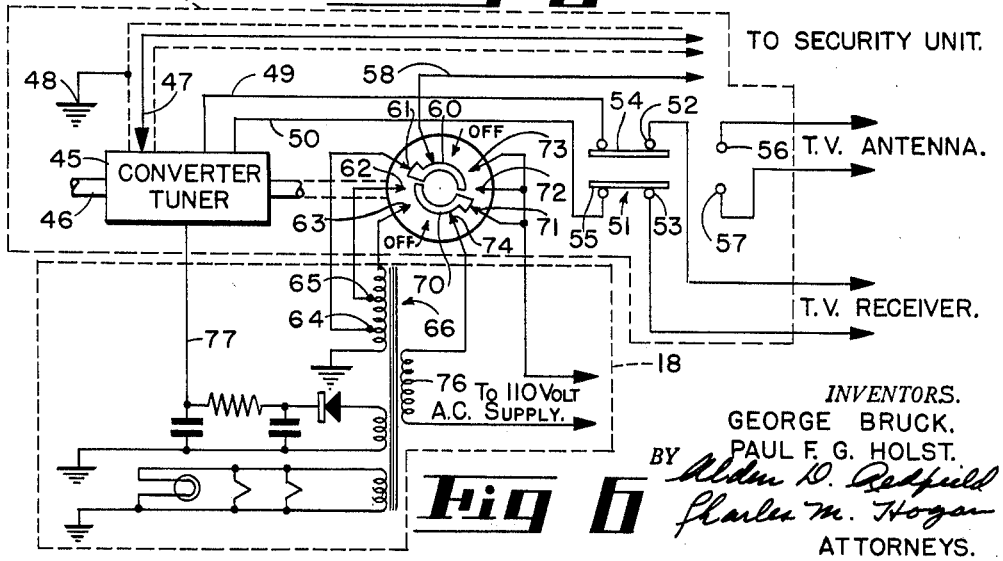
FIG. 6 is a circuit schematic showing the selector.

Now assume that the customer demands service by moving the selector control indicator from "off" position to the desired service, turning on the power supply 18. Then the converter 45 (FIG. 6) is energized and converts the received program signals into those for application to the input of television receiver 17 (FIG. 1). Simultaneously power is delivered to the security unit 13 (FIG. 4) which starts the data transmitter 30, renders operative the coder 31, 32, or 33 for the particular service demanded, and couples the appropriate filter or combination of filters 37, 38, or 39 to the converter, first removing the service "short" mentioned above. The coded meter information identifying the subscriber both by carrier frequency and by digital coded information is transmitted from unit 30 (FIG. 4) back through the coupler 15 to the branch line and substation. The metering device must be in operation as the subscriber obtains the demanded service.

Another security feature resides in the fact that the scanning and recording at the substation 21 are system functions beyond the control of the subscriber or the subscriber's equipment. The substation recording equipment continuously records the identities of the subscribers receiving service and the types and duration of the service being used.

The security unit can be adapted to any transmission involving channeled data. Before detailing the circuitry in the security unit 13, the selector-converter unit 16 illustrated in FIG. 6 will first be described in detail.

*Selector-converter unit*

The selector-converter comprises a converter tuner 45, the function of which is to convert the signals in any one of the channels A, B, or C to carrier signals of a frequency (preferably that of standard monochrome broadcast channels Nos. 5 or 6) suitable for application to the input of a conventional home television receiver. Such converters are well known to the art.

This converter tuner includes the usual tuning shaft 46 and tuning dial or knob (not shown) angularly manually positionable by the subscriber to select any one of channels A, B, and C. The incoming program is delivered to the converter tuner via line 47 from the security unit and ground 48, and the output of the converter tuner is coupled as by lines 49 and 50 and a double-pole, double-throw switch 51 to the input circuit contacts 52 and 53 of television receiver 17. When the subscriber desires to receive broadcast signals in conventional fashion, the switch 51 is thrown to the alternate position, in which blades 54 and 55 are in contact with fixed contacts 56 and 57, encircuited with a conventional television receiver antenna. When closed circuit pay TV signals are desired, the switch 51 is thrown into the position illustrated in FIG. 6, wherein the switch blades are in contact with contacts terminating in lines 49 and 50. Switch 51 may be mechanically coupled to the rotary switch in such a manner that the TV antenna is automatically connected to the TV receiver when the rotary switch is in its "off" position. In all other positions of the rotary switch the TV receiver is connected to the converter tuner 45.

The purpose of line 58 is to deliver to the security unit alternating-current voltages indicative of whether channel A, B, or C is desired, and this line is a part of the arrangements which assure energization of the security unit when and only when the selector has been manipulated to obtain delivery of a program from the closed circuit distribution system. Accordingly, the converter tuner shaft 46 is ganged to a switch which has an angularly movable contact 60 having several operating positions: one for channel A in which that contact engages fixed contact 61; one for channel B involving contact 62; one for channel C involving contact 63; and one for "off," where no contact is made, the operation being such that when the selector is in the channel A position a voltage of, say, 12 volts is applied from tap 64 of transformer 66 via contacts 61 and 60 to line 58 and then to the security unit; when channel B is selected, a different voltage of, say, 18 volts is applied from tap 65 via contacts 62 and 60 to line 58 and the security unit; similarly, for channel C a voltage of 24 volts is applied via contacts 63 and 60 to line 58 and the security unit. When the converter tuner shaft is in the fourth or "off" position, no voltage is applied to contact 60 and line 58, and this energizing circuit is broken.

The rotary switch further contains switching circuitry which causes the primary of transformer 66 to be energized only when one of the three channels is selected, and to be de-energized when the selector is in the "off" position. To that end there is provided a rotary contact 70 successively positionable with contacts 71, 72, and 73 for the three channels and continuously contacting contact 74, the last-mentioned contact being broken when the selector is in the "off" position, thereby to break the circuit between primary 76 and the 110-volt household power supply (not shown). This switch circuitry assures that the converter tuner and security unit will be energized only upon selection of one of the desired channels. One of the transformer secondaries supplies energy through a rectifier system and line 77 to the converter tuner, and the other secondary is tapped at 64 and 65 for the purpose indicated above.

Thus it will be seen that the invention provides a security unit adapted to be energized to release program signals in any one of a plurality of channels, a converter having a tuning shaft 46 angularly positioned to tune it to any one of said channels, a rotary selector switch ganged to said tuning shaft, a power supply 18 (inclusive of transformer 66 and associated circuitry), and means controlled by the selector switch for coupling the power supply (via line 58) to the security unit 13 to energize such unit. It will be understood that the power supply designated by the collective reference numeral 18 in FIGS. 1 and 4, for example, includes not only the transformer 66 illustrated in FIG. 6 but also the rectifier system there shown and the connections pertinent to the power supply.

Having described the selector-converter unit in detail, reference is next made to the detailed circuitry of the security unit, the block diagram of which was discussed in the description of FIG. 4.

*The detailed circuits of the security unit*

Figure 5:
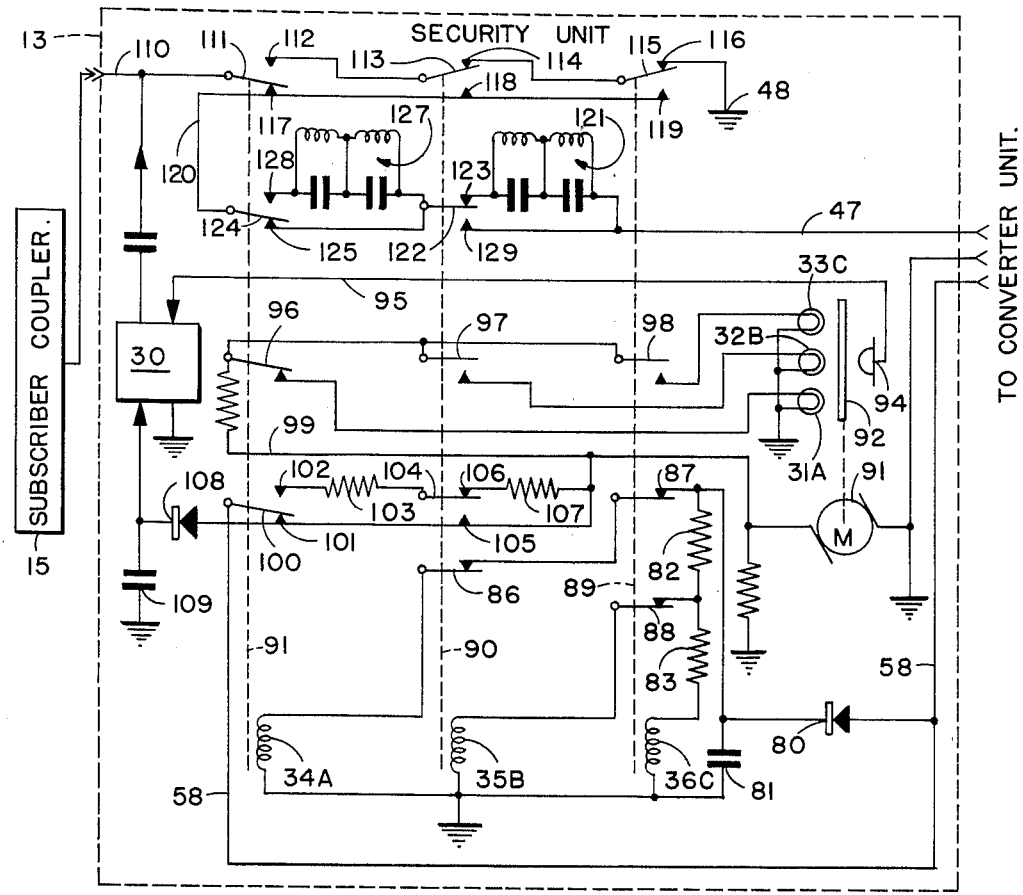
FIG. 5 is a circuit schematic of the security unit.

Referring now to FIG. 5, it has been shown that one of three A.C. voltages, dependent on the channel selected, is available between line 58 and ground 48, all grounded points herein being designated 48 to indicate that they are connected together. The voltage so available is rectified by an arrangement comprising diode 80 and filter capacitor 81 and applied to a voltage divider comprising resistors 82, 83 and relay winding 36C. In FIG. 5 there are shown three voltage-sensitive relays having windings designated 34A, 35B, and 36C, the arabic numerals indicating that these windings are parts of voltage-sensitive switches 34, 35, and 36 (FIG. 4), and the upper case suffixes indicating the channels to which such windings pertain. The rationale of the voltage-sensitive switches is that when the voltage on line 58 is 12 volts, indicative of the selection of channel A, winding 34A is energized. On selection of channel B, winding 35B is energized. On selection of channel C, winding 36C is energized. Accordingly, winding 34A is coupled across the entire voltage divider via normally closed contacts 86 and 87. Winding 35B is coupled across two-thirds of the voltage divider via contacts 88.

Relay 36 controls contacts 87 and 88, via a suitable ganging expedient 89, in such a way that when channel C is selected the windings 34A and 35B of the other two relays are open-circuited. Voltage-sensitive switch 35, via a suitable ganging expedient 90, controls contacts 86 in such a way that when channel B is selected, winding 34A is open-circuited. The selection of channel B will not cause winding 36C to be energized because of insufficient voltage across it. The selection of channel A will not cause either voltage-sensitive switch 35 or 36 to be tripped because the voltage is insufficient. Thus it will be seen that the security unit includes a plurality of voltage-sensitive relays, one for each channel. Each relay, operating via its ganging means—89, 90, or 91, as the case may be—controls sets of contacts which perform these functions:

(1) The selection of the proper code for the service being utilized;

(2) The ungrounding of the consumer drop line (110, FIG. 5) and the selection of the filter system appropriate to the delivery of the program desired;

(3) The energizing of the metering transmitter 30 while inserting series resistance in circuit therewith to assure that the same energizing voltage is always applied to the transmitter.

First let us consider the selection of the appropriate code.

A suitable coding device comprises a constant-speed motor 91 which causes a digital code wheel 92 to rotate. This code wheel may be formed with three concentric code tracks (not shown), each suitably apertured to speak in digital language as the code wheel rotates. One of the tracks is in registry with light source 33C, and the other tracks are in registry with light sources 32B and 31A, respectively. Again, the arabic numerals are here used in FIG. 5 to indicate that those lights are parts of the coders 31, 32, and 33 illustrated in FIG. 4. Also, the upper case suffixes are indicative of the pertinent channel. The reference numeral 94 indicates a photo-sensitive device which is coupled as by line 95 to transmitter 30 to modulate the code thereon. Lamp 33C and its associated track and phototube 94 constitute a coder or light pulse generator for channel C. Light source 32B and its associated track and phototube 94 constitute a light pulse generator for channel B. Light source 31A and its associated track and phototube 94 constitute a light code generator for channel A, so that the selection of an appropriate coder for the channel to be delivered resolves down to the simple encircuiting of the appropriate light source.

Code wheels having a plurality of tracks registering with separate light sources are per se well known to the art and are shown in many texts such as "Logical Design of Digital Computers," Phister, page 231, John Wiley & Sons, Inc., 1958.

The desired selection of the appropriate light source and therefore the appropriate coder is accomplished by relay contacts 96 (for channel A), 97 (for channel B), and 98 (for channel C), each in circuit between one side of the appropriate light source or lamp and constant voltage conductor 99. The relay contacts 96, 97, and 98 are included in the voltage-sensitive switches 34, 35, and 36, respectively, and are individually controlled thereby to select the coding pertinent to the channel under reception.

Since any one of three different voltages may be supplied by line 58, relay contacts are also provided for the purpose of maintaining conductor 99 at the same voltage; that is to say, when channel A is being received, contacts 100 and 101 included in voltage-sensitive switch 34 connect line 58 to conductor 99 to supply 12 volts to that conductor. When channel B is being received, line 58 is connected to conductor 99 by contacts 100 and 102, dropping resistor 103, contact 104, and contact 105, dropping the voltage of 18 volts at line 58 to 12 volts at conductor 99. Likewise, when channel C is being received, line 58 is connected to conductor 99 through contacts 100 and 102, dropping resistor 103, contacts 104 and 106, and dropping resistor 107, whereby the voltage of 24 volts at line 58 is dropped to 12 volts at line 99. Line 99 is connected via series diode 108 and filter capacitor 109 to the transmitter 30 to supply D.C. potential thereto. As previously described, the operation of the selector is such as to energize line 58 and assure operation of metering transmitter 30 whenever a program is being received. The insertion of voltage-dropping resistors 103 and 107 is assured by the control of voltage-sensitive relays 34 and 35 over the following groups of contacts, respectively: 100–102; 104–106. FIG. 5 illustrates all contacts in the positions pertinent to the reception of channel A.

As stated, another function of the security unit is to "unshort" the drop line and deliver the selected program. The subscriber's drop line 110 is, in the absence of any selection, shorted to ground by the following normally closed sets of contacts: 111, 112, 113, 114, 115, and 116, the sets being respectively controlled by voltage-sensitive relays 34, 35, and 36 in such a way that the "short" is removed whenever a channel is selected, the moving contacts 111, 113, and 115 being connected to the ganging expedients 91, 90, and 89, respectively. Actuation of relay 34 causes the drop line 110 to be connected to program delivery contact 117. Similarly, actuation of switches 35 or 36 causes the drop line 110 to be encircuited with program delivery contact 118 or program delivery contact 119.

Signals in all program channels are applied to line 120. Interposed between lines 120 and 47, the latter being the program delivery line to the subscriber's home installation, are suitable filtering arrangements for the selection of the single desired channel. A filter network designated by the reference numeral 121 rejects channel B to provide for the reception of channels A and C only, and is interposed in circuit between lines 120 and 47 by normally closed contacts 122 and 123 and normally open contacts 124 and 125, the latter being closed (as shown in FIG. 5) by the tripping of relay 34, so that filter network 121 functions as a series filter. Similarly, the filter network designated by the reference numeral 127 is inserted in circuit between lines 120 and 47 for the reception of channels B and C only (channel A being rejected). Filter 127 is placed in circuit by reason of the operation of normally closed contacts 124 and 128 and normally open contacts 122 and 129, the latter set being closed by the tripping of relay 35. Finally, filters 121 and 127 are collectively serially in circuit between lines 120 and 47 for channel C reception, contacts 124, 128 and 122, 123 being in their normally closed positions. The filter blocks designated 37 and 38 in FIG. 4 include, respectively, the filters 121 and 127 of FIG. 5 and associated contacts; and the filter block 39 of FIG. 4 symbolically represents the filters 127 and 121 and associated contacts when the filters are connected in series. It should be noted that the arrangement, as described, does not restrict the transmission of channel C, since this is a free channel.

*The substation equipment*

In FIG. 7 there are shown the principal units of the scanner and recorder 22 of FIG. 1. This equipment successively repetitively is tuned to the frequencies of all of the subscriber metering signal generators. Subscriber interrogation is based on frequency selection. The selectivity of the receiver insures selective reception of the signal from individual security boxes. To that end, the representative substation is equipped with a frequency sweeping receiver 140, repetitively successively tuned through the band encompassing the metering signal carriers of all of the subscribers by a suitable tuner actuated by a scanner drive 141.

When the frequency to which receiver 140 is tuned coincides with the meter-signal carrier frequency of any subscriber, that subscriber's code appears at the output of the receiver, whereupon such code is amplified, printed and serially stored by the amplifier, printer, and memory units 142, 143, and 144, respectively. The purpose of the system clock or timer 145 is to limit the operation of the receiver 140 and associated amplifier, printer, and memory units to periods when program service is being offered.

The substation equipment designated by the reference numeral 21 in FIG. 1 is also shown collectively in FIG. 8, inclusive of the FIG. 7 scanning receiver 140. The function of the substation equipment shown in FIG. 8 is not only to receive and record all the coded metering signals from the subscribers, but also to identify the substation on the tape and to receive program start and stop coded indications sent out by the transmitter. To the latter end there is provided a timing receiver 148 which is coupled by line 149 to a recorder coupler, and that coupler (generally similar to the subscriber coupler) is connected to the branch line for a group of subscribers. The timing receiver output is coupled to the recording equipment 143, 144 in such a manner as to place on the recording tape indications of program start and stop.

The receiver 140 comprises a radio frequency amplifier 150 and the following successive stages in cascade therewith:

A frequency converter or mixer 151, for converting the received carrier frequency metering signals to intermediate frequencies for high gain amplification;

First and second intermediate frequency amplifiers 152 and 153;

A detector and AGC unit 154 for deriving the coded modulation components of the signals successively received from the various subscribers, and also for controlling the gain of the receiving equipment, to assure constant output levels;

And a local oscillator 157, coupled to the mixer 151 in conventional manner.

In addition, there are provided first and second code (i.e., audio) amplifiers 155 and 156 for amplifying the derived coded modulation components.

The scanner drive 141 includes a sweep capacitor and motor which drives the capacitor shaft in such a way as synchronously to sweep the radio frequency amplifier and oscillator through their tuning range, as shown by the dotted line indicative of ganging expedient 158. This drive synchronously varies the frequency of the local oscillator 157 in order to attain maximal amplification and selectivity of the instantaneously selected signal frequencies. The receiver further includes suitable conventional power transformer and rectifier-filter arrangements 159 and 160.

In addition to receiving the metering signals from the various subscribers and causing them ultimately to be applied to a tape record by magnetic recording equipment, the radio frequency receiver 140 also receives and causes to be recorded coded signals identifying the particular substation involved. For that purpose a suitable substation code generator 161 has its output circuit coupled to the input of radio frequency amplifier 150.

The substation identification code generator 161 may, to insure very high reliability, consist of a pair of crystal-controlled oscillators operating on the two highest frequencies assigned in the code transmission band, together with two code generators driven by a synchronous motor.

The scanning receiver scans the frequency range of 3 to 5 megacycles in a given period, say 7.5 minutes, in order to receive any potential subscriber code signal being generated. The two highest channels in this band are assigned to the crystal-controlled oscillators in the substation code generator 161. Unit 161 includes a code generator which modulates the higher frequency crystal oscillator with the substation call letters, and the output of that oscillator is coupled to the scanning reciver to identify such call letters on the recording tape. The other oscillator in unit 161 is, as mentioned above, assigned the next highest frequency. It is modulated by all pulses in the complete code signal and its output is also coupled to the input of the scanning receiver 140. The output of the timing receiver is coupled to magnetic recorder 143, 144 to indicate program start or stop. Timer 145 is simply a synchronous clock which connects the scanner-recorder to the power supply lines only during the scheduled daily broadcast.

Figure 2:
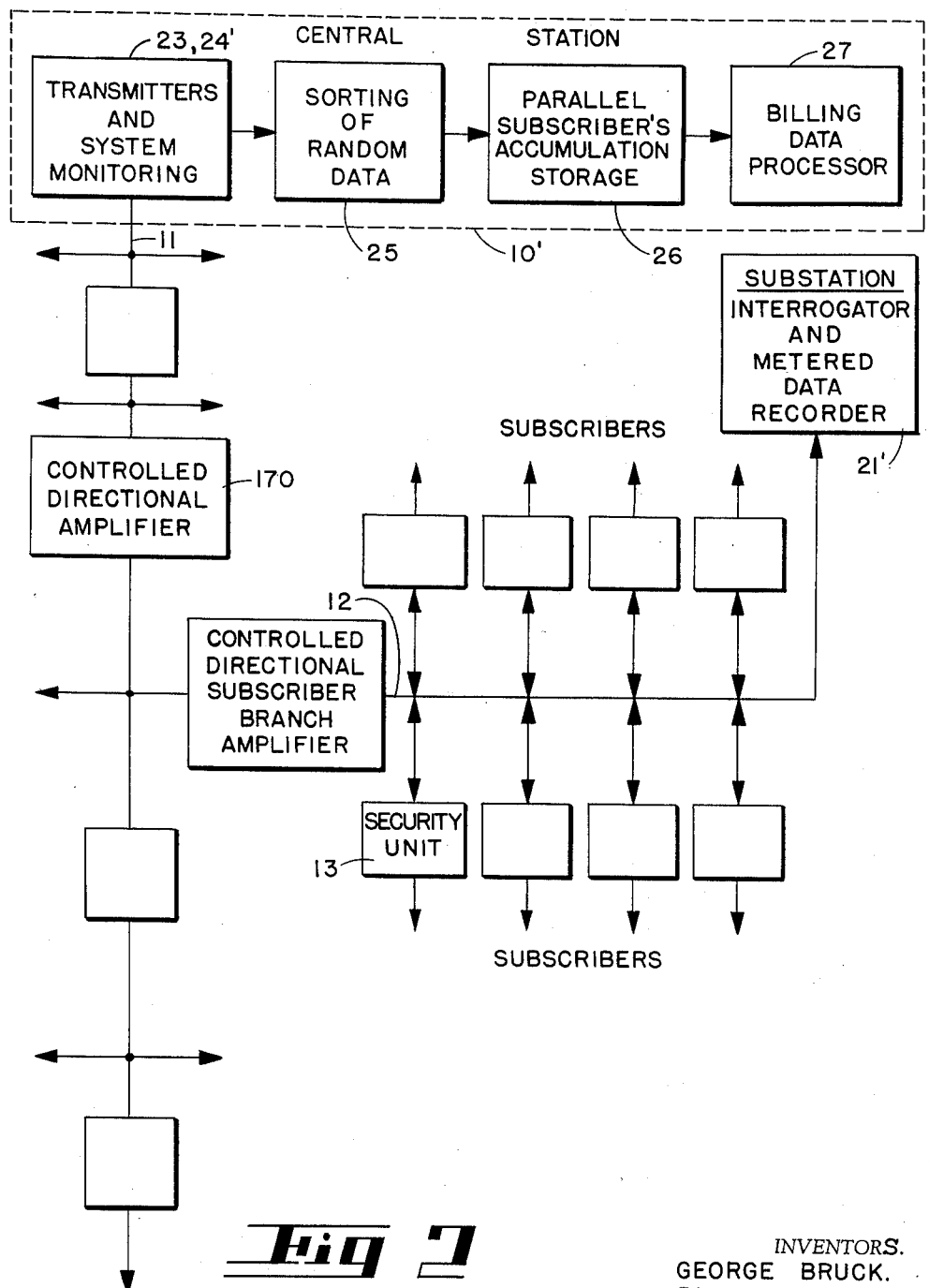

The FIG. 2 system

In the FIG. 1 system the arrows between the units 21 and 24 indicate that the central station is provided with suitable equipment 24 which, at the end of the day's program, interrogates the substation recording equipment and records in serial form all the metering data from all of the substations. Optionally, the tapes from the substations may be manually sent to the central station. The FIG. 1 system postulates either manual tape deliveries of this kind or separate wired links between the central station and each substation for purposes of delivery of the substation recorded data to the central station. In the FIG. 2 system, on the other hand, the data recorded at substation 21' are transmitted back to the central station 10' via the program distribution system.

In the FIG. 2 system there is provided central station 10', generally similar to that previously described, together with trunk lines 11 and subscriber branch lines 12, each branch line having coupled thereto a plurality of security units 13, which security units are individually coupled to subscriber installations as described above. The principal feature of the FIG. 2 system resides in the use of the distribution system itself to transmit to the central station all of the metering data recorded at the various substations. There are inserted into the distribution system controlled directional amplifiers 170. During the daily program period these amplifiers permit the flow of program material outwardly toward the subscriber and the substations, each substation 21' recording the metering signals and the usage in the same manner as the substation 21 of FIG. 1. That is to say, the pass band of the amplifier units 170, going outwardly, comprises that part of the spectrum inclusive of channels A, B, and C designated above.

After the conclusion of the program period, the interrogating equipment, included in the block designated 23, 24' in FIG. 2, interrogates the substations via the distribution system and records serially the usage data from all of the substations. The interrogation is performed by suitable coding signals modulated onto a 24-megacycle carrier, for example, such carrier being within the pass band of the amplifier units 170 for signals going outwardly. During this phase of operation, the controlled directional amplifiers permit the passage of metering signal data from the substations back to the central station. The substations may be "read out" at 44 megacycles, for example. That is to say, the data already recorded at the several substations 21' are, in response to the interrogation mentioned above, transmitted via the distribution system back to the central station, where the data are re-recorded and processed for billing. Accordingly, the pass band of the amplifier units 170, for signals passing in the direction from the substations toward the central station, is out of the portion of the spectrum embracing channels A, B, and C, and preferably is at a high frequency such as 44 megacycles mentioned above.

It will be clear from the foregoing description that the recording equipment at the substation records signals within the subscriber band of 3 to 5 megacycles and responds to coded signals on the 24-megacycle carrier to transmit the recorded data back to the central station.

It will be understood that with this system it is practical to record metering signal data at the substations during a program of, say, thirty minutes, and then transmit all such data back to the central station within a very short period between programs—of, say, a minute or less.

With respect to the transmittal of metering signals from the individual security units to the substations 21', the FIG. 2 system is identical to the FIG. 1 system. In the FIG. 2 system, when the program transmission has been concluded, the substations are, as has been indicated, sequentially interrogated by a periodic interrogator and high-speed reader 24' included in the central station system, and the accumulated data at the substation 21' are delivered at a high rate into a centralized sorter 25, for restorage in an accumulative sense by unit 26 for each subscriber during a billing period. The data so stored in parallel storage unit 26 are utilized in data processor 27 to prepare monthly bills.

The code

It has been pointed out that each subscriber equipment is associated with a security unit 13 which sends out metering signals in digital language indicative of reception of a program by a subscriber, the channel being received, the identity of the subscriber, and the duration of such reception. A suitable digital code for this purpose is illustrated in FIG. 9, in which the first long pulse indicates start of the code, one or more of the next two pulses indicates the channel being used, and a suitable permutation selected from among the next eight pulses identifies the subscriber. The third through tenth pulses constitute what is meant by the expression "entire subscriber code." The eleventh pulse is a suitable parity pulse provided for purposes of checking and error detection, the parity check being per se a well known expedient in coding and data processing equipment.

It is essential for the proper operation of the system that each block of subscribers, with its substation, be effectively isolated from all other blocks in so far as the 3–5 megacycle metering signals are concerned.

While there have been shown and described what are at present considered to be the preferred embodiment of the invention and an alternative system generically included therein and specifically the subject of the aforementioned copending Bruck patent application, it will be understood by those skilled in the art that various modifications and changes may be made therein without departing from the proper scope of the invention as described in the appended claims.

Having fully disclosed and described our invention, we claim:

1. A closed-circuit transmission system for programmed pay television service comprising:
   a central station television transmitter for transmitting a plurality of programs, each involving complete unscrambled television-signal modulations on a separate carrier frequency,
   a distribution network comprising coaxial trunk cables coupled to said transmitter,
   coaxial branch cables coupled to said trunk cables,
   branch cable couplers for coupling said branch cables to subscriber-station equipments,
   a scanner-recorder coupled to the distribution network for reading and recording metering signals from a plurality of such equipments,
   and a plurality of subscriber-station equipments each comprising a home installation and a security unit located close to said installation but at a place substantially inaccessible to the subscriber;
   each home installation comprising a selector operable by the subscriber to select the desired program, and a frequency converter for converting it into signals suitable for application to a home television receiver;
   each security unit comprising means controlled by the associated selector for switching the desired program to the associated home installation, and meter means interlocked with the selector for transmitting to said scanner-recorder through the distribution network metering signals which identify the subscriber and program being received.

2. In a programmed television service distribution system, the combination of:
   means for delivering to a distribution line a plurality of programs each of which is modulated on a separate carrier frequency in a distinct channel,
   selector-converter means accessible to the subscriber for selection of the desired channel and conversion of the signals therein into a signal input to a television receiver,
   a television receiver coupled to said selector-converter means,
   and a security unit located at a place substantially inaccessible to the subscriber for interlocking the furnishing of the program and metering of the usage thereof;
   said security unit comprising a transmitter for generating metering signals and transmitting them through the distribution line, code-generating means for each channel, said code-generating means being coupled to said transmitter to modulate code signals on the output of each transmitter, means actuated by the selector-converter means for rendering operative the transmitter and one of the code-generating means, and means actuated by the selector-converter means for releasing signals from the desired channel into the selector-converter means.

3. In a programmed television service distribution system of the type including a distribution line, means for delivering to that line a plurality of programs each of which is modulated on a carrier frequency in a separate channel and a selector at the subscriber's location for selecting the desired program and furnishing distinct voltages indicative of the channels,
   a security unit adapted to be located in a place substantially inaccessible to the subscriber and to interlock the delivery and metering of a program, comprising:
   a plurality of voltage-sensitive control relays adapted to be actuated by individual ones of said voltages in accordance with the channel desired and selected,
   a code generator having a plurality of coding devices, one for each of said channels,
   means including contacts controlled by said relays for releasing the desired program,
   means including contacts controlled by said relays for selecting the proper coding device,
   and a carrier-signal generator coupled between said code generator and transmission line,
   the output of said code generator being modulated on that of said carrier-signal generator to produce metering signals transmitted back to said transmission line and having a frequency and code characterizing the subscriber and the program being delivered,
   security being achieved by the inaccessibility of the security unit, the energizing thereof by voltages from the selector, and the interlock of delivery and metering of the program.

4. In a programmed television service distribution system, the combination of:
   means for delivering to a distribution line a plurality of programs each of which is modulated on a separate carrier frequency in a distinct channel,
   selector-converter means accessible to the subscriber for selection of the desired channel and conversion of signals therein into a signal input to a television receiver,
   a television receiver coupled to said selector-converter means,
   and a security unit located at a place substantially inaccessible to the subscriber for interlocking the furnishing of the program and metering of the usage thereof;
   said security unit comprising meter means for generating metering signals and transmitting them through the distribution system, means actuated by the selector-converter means for rendering operative the meter means, and means actuated by the selector-converter means for releasing signals from the desired channel into the selector-converter means.

5. In a closed-circuit transmission system having wired distributing means for programmed television service, the combination of:
   a television receiver having an input circuit;
   a converter having an output circuit;
   a selector for coupling the output circuit of the converter to the input circuit of the television receiver;
   security means for simultaneously releasing the desired program signals from the wired distributing means to the converter and transmiting metering signals back to the wired distributing means;
   a power supply;
   and means controlled by the selector for simultaneously coupling the power supply to the converter and the security means;
   the wired distributing means supplying service on three program channels;

the power supply providing three voltages, each characteristic of one of said channels;

and the selector choosing any one of said three program channels and applying to the security means the voltage pertinent to the selected channel;

said security means comprising:

a carrier-wave generator;

three voltage-sensitive relays, one for each channel, each actuated by a distinct one of said voltages;

separate filter means for each channel, each filter means being capable of being coupled to the input of the converter to supply only the desired program to the converter;

separate coders for each channel, each coder being capable of identifying a particular channel being received;

contacts controlled by each relay to select the filter means and coder pertinent to the desired channel;

and means for modulating the output of the selected coder onto the output of said carrier-wave generator.

6. In a programmed television service distribution system, the combination of:

means for delivering to a distribution line a plurality of programs each of which is modulated on a separate carrier frequency in a distinct channel, program-ordering means, including a selector and a converter accessible to the subscriber for selection of the desired channel and conversion of the signals therein into a signal input to a television receiver, a television receiver coupled to said converter, and a tamper-proof security unit for interlocking the furnishing of the program and metering of the usage thereof;

said security unit comprising meter means for generating metering signals distinctive of the subscriber and transmitting them through the distribution system to identify the subscriber, means interlocked with the program-ordering means for rendering operative the meter means, and means interlocked with the program-ordering means for releasing signals from the desired channel into the converter.

7. A closed-circuit system for the distribution of programmed television services, comprising:

a central station for transmitting said services;

a distribution network comprising trunk lines coupled to the central station and branch lines coupled to said trunk lines;

subscriber stations coupled to said branch lines, each comprising a television receiver, means including a converter for selecting and utilizing one of the distributed services, and signaling means protected from the subscriber and interlocked with the last-named means for transmitting through the network metering signals which identify the subscriber and indicate the nature and extent of such usage, the signaling means comprising a high-frequency carrier signal generator which operates on a frequency channel individual to the subscriber within a substation group, the signaling means further comprising a digital code generator for modulating onto the output of the carrier signal generator signals identifying the service used and the subscriber;

and scanner-recorder means coupled to the distribution network for reading and recording the metering signals from a plurality of said subscriber stations.

References Cited by the Examiner

UNITED STATES PATENTS

| | | | |
|---|---|---|---|
| 2,488,508 | 11/1949 | Goldsmith | 346—37 |
| 2,513,112 | 6/1950 | Shepherd | 179—7 |
| 2,570,209 | 10/1951 | Cotsworth | 178—5.1 |
| 2,573,349 | 10/1951 | Miller | 178—5.1 |
| 2,674,512 | 4/1954 | Bogert | 235—52 |
| 2,710,343 | 6/1955 | Thompson | 178—5.1 |
| 2,755,161 | 7/1956 | Rahmel | 340—183 |
| 2,757,226 | 7/1956 | Zworykin | 178—5.1 |
| 2,840,815 | 6/1958 | Andres | 178—5.1 |
| 2,854,506 | 9/1958 | Pickles | 178—5.1 |
| 2,870,258 | 1/1959 | Cooper | 340—183 |
| 2,996,580 | 8/1961 | Reid | 235—52 |
| 3,034,707 | 5/1962 | Jefferson | 235—52 |
| 3,048,822 | 8/1962 | Wendt | 178—5.1 |
| 3,058,065 | 10/1962 | Freeman | 325—31 |

OTHER REFERENCES

"An Instantaneous Audience Measurement System," Tele-Tech, May 1949, pages 38, 39, 64 and 65.

DAVID G. REDINBAUGH, *Primary Examiner.*

NEWTON N. LOVEWELL, *Examiner.*

ELI J. SAX, STEPHEN W. CAPELLI, J. E. HAWES, R. HESSIN, H. W. BRITTON, *Assistant Examiners.*